US006639740B1

(12) United States Patent
Spinali

(10) Patent No.: US 6,639,740 B1
(45) Date of Patent: Oct. 28, 2003

(54) CATADIOPTRIC LENS BARREL STRUCTURE HAVING A PLURALITY OF SPLIT LENS BARRELS AND A SUPPORT STRUCTURE SUPPORTING THE SPLIT LENS BARRELS

(75) Inventor: Marc Spinali, Danville, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/636,063

(22) Filed: Aug. 10, 2000

(51) Int. Cl.$^7$ ................................................ G02B 7/02
(52) U.S. Cl. ........................................ 359/811; 359/820
(58) Field of Search ................................ 359/811, 819, 359/820

(56) References Cited

U.S. PATENT DOCUMENTS

| | | | |
|---|---|---|---|
| 3,722,996 A | 3/1973 | Fox | 355/53 |
| 4,724,466 A | 2/1988 | Ogawa et al. | 355/53 |
| 4,733,945 A | 3/1988 | Bacich | 359/820 |
| RE33,836 E | 3/1992 | Resor, III et al. | 355/43 |
| 5,187,519 A | 2/1993 | Takabayashi et al. | 355/53 |
| 5,428,482 A | 6/1995 | Bruning et al. | 359/827 |
| 5,576,895 A | 11/1996 | Ikeda | 359/811 |
| 5,691,806 A | 11/1997 | Tokuda et al. | 355/77 |
| 5,973,863 A * | 10/1999 | Hatasawa et al. | 359/823 |
| 6,239,924 B1 | 5/2001 | Watson et al. | 359/819 |

FOREIGN PATENT DOCUMENTS

WO    WO99/27570    3/1999

* cited by examiner

Primary Examiner—Ricky Mack
(74) Attorney, Agent, or Firm—Finnegan, Henderson, Farabow, Garrett & Dunner, L.L.P.

(57) ABSTRACT

A catadioptric lens barrel structure for a projection exposure apparatus includes first and second lens barrels, each having an optical axis that is parallel to the other, and a transverse lens barrel connecting the first lens barrel to the second lens barrel. The catadioptric lens barrel structure may be used in semiconductor fabrication by placing a reticle in front of the entrance of the first lens barrels and a wafer in front of the exit of the second lens barrel. The first and second lens barrels comprise a plurality of sub-barrels serially aligned along the corresponding optical axis. There is physical separation between each sub-barrel in the series to isolate each sub-barrel from thermal and vibrational effects propagated by the other sub-barrels in the series. A support structure is provided to support each of the plurality of sub-barrels and is made of a material having a low coefficient of thermal expansion. The support structure comprises a plurality of support platforms.

20 Claims, 4 Drawing Sheets

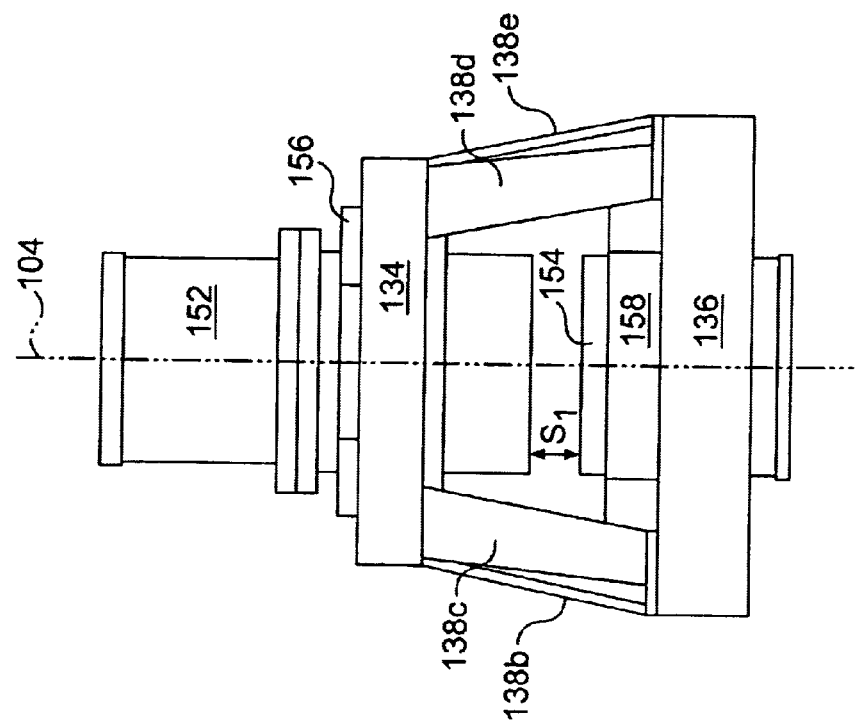
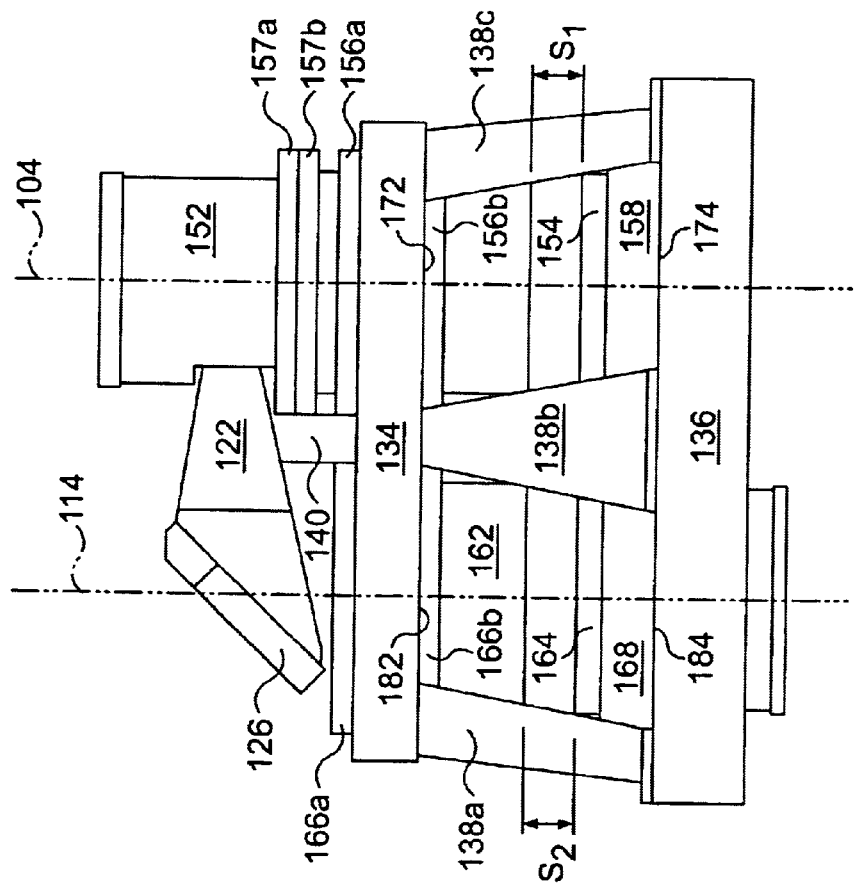

CATADIOPTRIC LENS BARREL STRUCTURE HAVING A PLURALITY OF SPLIT LENS BARRELS AND A SUPPORT STRUCTURE SUPPORTING THE SPLIT LENS BARRELS

BACKGROUND OF THE INVENTION

1. Field of the Invention

This invention relates to a catadioptric lens barrel which can be attached to an optical projection unit, such as a projection exposure apparatus used to manufacture semiconductor wafers. More particularly, the present invention relates to a catadioptric lens barrel structure including its support structure, wherein the lens barrel structure comprises a plurality of lens barrels aligned in parallel and at least one transverse lens barrel connecting the plurality of lens barrels.

2. Description of the Related Art

A lens barrel is a tubular mechanical structure containing a series of lenses which are aligned to transfer an image from one end of the lens barrel to the other. The lens barrel may include a sturdy threaded body and durable metal retaining rings, often referred to as sub-barrels, to carry a series of lens holders, commonly referred to as cells. Another type of lens barrel is known as a catadioptric lens barrel. A catadioptric lens barrel contains not only refractive elements, such as lenses, but also reflective elements, such as mirrors.

Both optical barrel types are commonly used in optical systems. For example, optical projection units having a lens barrel may be used in a projection exposure apparatus for production of semiconductor wafers. The projection exposure apparatus includes a reticle positioned near an entrance end of the lens barrel and a semiconductor wafer positioned near an exit end. The reticle defines a pattern of signal paths to be etched on a semiconductor wafer. The projection exposure apparatus shines light through the reticle, and transfers the pattern through the lens barrel onto a predetermined area on the semiconductor wafer. The semiconductor wafer is a silicon wafer with a photo-sensitive coating for making semiconductor devices, such as microprocessor or memory chips.

A catadioptric lens barrel system using two or more lens barrels, arranged in parallel, offers benefits not found in conventional single barrel systems. The parallelism of the lens barrels reduces the overall height of the lens barrel system, but increases the overall width. Reduced height is important for many reasons, such as for ease of transport. This type of catadioptric lens barrel design, however, poses several problems. First, keeping proper alignment of a plurality of lens barrels can be difficult. Second, the focus depth of the projection system changes as temperature changes. Coefficients of thermal expansion of the lens barrels, including their internal components, and the indices of refraction of the lens materials vary with temperature. Errors resulting from these factors collectively alter the focusing properties of the optical system. Third, the catadioptric lens barrel structure tends to be more sensitive to movement or vibration than conventional single barrel designs.

In light of the foregoing, there is a need for a catadioptric lens barrel structure that holds the lens barrels stably and accurately, and minimizes distortion errors due to temperature changes, vibrational, or other external forces, so that the resulting image is accurately focused as it is transferred and reduced from the reticle to the wafer.

SUMMARY OF THE INVENTION

The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a lens barrel structure. The lens barrel structure may be used, for example, in a projection exposure apparatus in semiconductor manufacturing to reduce a pattern on a reticle through the projection exposure apparatus to a semiconductor wafer. The lens barrel structure comprises a plurality of lens barrels and a support structure. Each lens barrel has an optical axis running along a length of the lens barrel. At least one of the lens barrels comprises a plurality of sub-barrels which are serially oriented along the corresponding optical axis. Each sub-barrel is physically separated from the other sub-barrels in the series. This physical separation isolates each sub-barrel from thermal and vibrational effects, or other external forces propagated from the other sub-barrels in the series.

The present invention is also directed to a lithography system such as for use in a semiconductor manufacturing including the lens barrel structure as described above.

The present invention is further directed to a method for making a lens barrel structure. The method comprises the step of providing a plurality of lens barrels. Each lens barrel has an optical axis running along a length of the lens barrel. At least one of the lens barrels comprises physical separate, serially oriented sub-barrels. Each sub-barrel has an optical sub-axis. The method also comprises the steps of aligning the optical sub-axis of each sub-barrel in a series with the optical axis of the corresponding lens barrel, and supporting each lens barrel. A support structure for supporting the lens barrels is made of a material having a low coefficient of thermal expansion, which further reduces the effects of environmental changes on the lens barrel structure.

Both the foregoing general description and the following detailed description are exemplary and explanatory only and are not restrictive of the invention as claimed. Additional advantages will be set forth in the description which follows, and in part will be understood from the description, or may be learned by practice of the invention. The objects and advantages may be obtained by means of the combinations set forth in the attached claims.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

FIG. 3 is a front view of the catadioptric lens barrel structure consistent with the principles of the present invention;

FIG. 4 is a side view of the catadioptric lens barrel structure consistent with the principles of the present invention.

DESCRIPTION OF THE PREFERRED EMBODIMENT

Reference will now be made in detail to an embodiment of the invention, examples of which are illustrated in the accompanying drawings. Wherever possible, the same reference numbers will be used throughout the drawings to refer to the same or like parts. The invention will be further clarified by the following examples, which are intended to be exemplary of the invention.

Consistent with the principles of the present invention, a catadioptric lens barrel structure is provided with a plurality of lens barrels and a support structure. The support structure is configured to provide enhanced stability and is made out of materials that reduce the effects of environmental changes on the lens barrel structure. The lens barrels run parallel to each other. At least one lens barrel comprises a plurality of sub-barrels which are serially oriented along the corresponding optical axis of the lens barrel. Each sub-barrel is physically separated from the other sub-barrels in the series. This physical separation isolates each sub-barrel from thermal and vibrational effects, or other external forces propagated from the other sub-barrels in the series. The support structure is made of a material having a low coefficient of thermal expansion, which further reduces the effects of environmental changes on the lens barrel structure.

Figure 1:
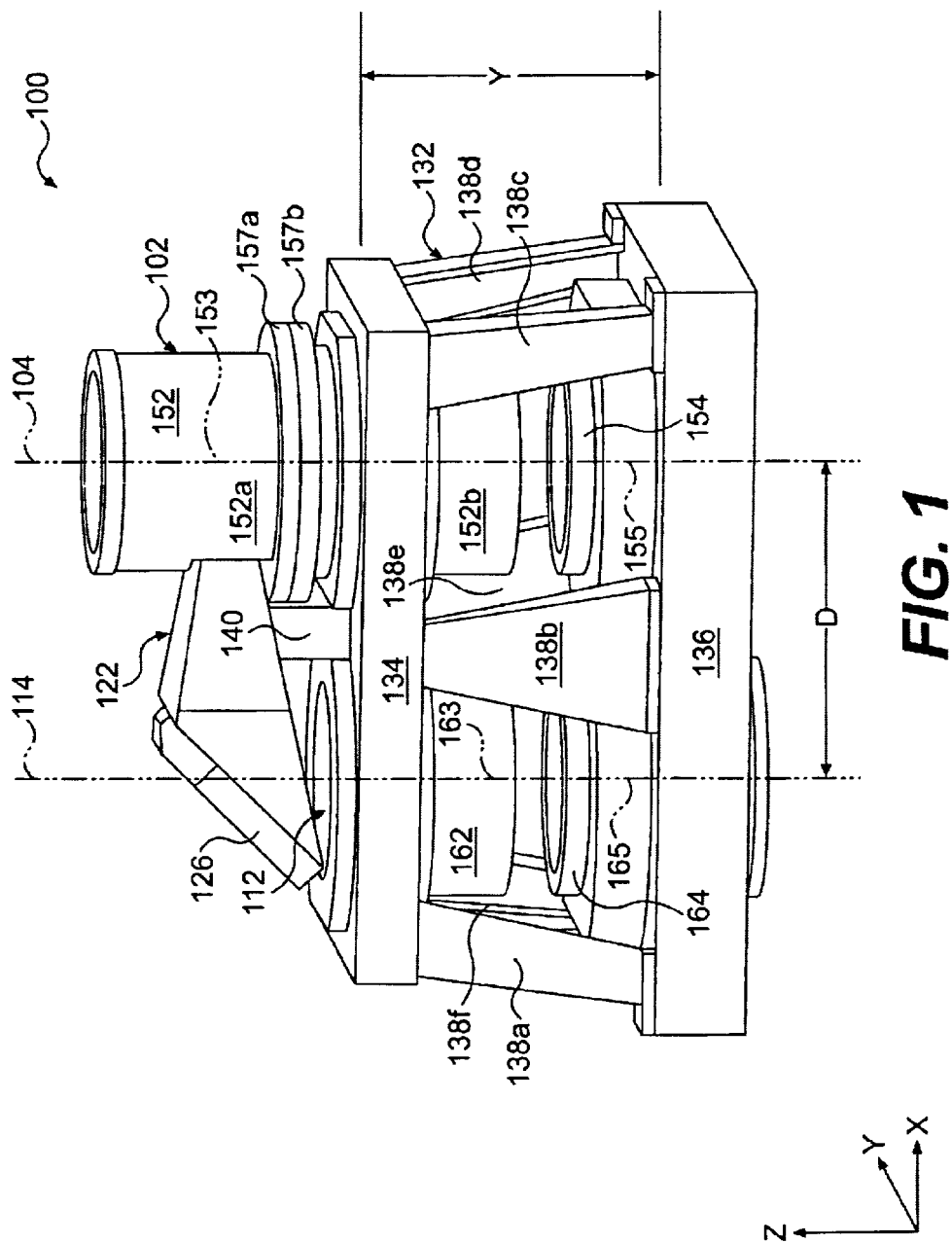
FIG. 1 is a perspective view of a catadioptric lens barrel structure consistent with the principles of the present invention.

FIG. 1 illustrates a lens barrel system consistent with the principles of the invention, wherein a catadioptric lens barrel structure 100 comprises a plurality of lens barrels including a first lens barrel 102 and a second lens barrel 112. First lens barrel 102 has a first optical axis 104 running along its length. Second lens barrel 112 has a second optical axis 114 running along its length. First lens barrel 102 comprises an upper sub-barrel 152 and a lower sub-barrel 154. Upper and lower sub-barrels 152 and 154, respectively, have optical sub-axes 153 and 155, respectively. Optical sub-axes 153 and 155 preferably align with first optical axis 104. Upper sub-barrel 152 may further comprise sub-barrel 152a and sub-barrel 152b connected together by a pair of flanges 157a and 157b.

Likewise, second lens barrel 112 comprises an upper sub-barrel 162 and a lower sub-barrel 164. Upper and lower sub-barrels 162 and 164, respectively, have optical sub-axes 163 and 165, respectively. Optical sub-axes 163 and 165 preferably align with second optical axis 114.

In the embodiment of FIG. 1, the sub-barrels of a lens barrel are physically separated to allow for expansion. Sub-barrel 152 is physically separated from sub-barrel 154. If the length of sub-barrel 152 changes ΔL1 in response to thermal or other changes, and sub-barrel 154 changes ΔL2, then, the physical separation between sub-barrels 152 and 154 must be greater than the accumulative changes in length of sub-barrels 152 and 154 (ΔL1+ΔL2). Similarly, sub-barrel 162 is physically separated from sub-barrel 164. If the length of sub-barrel 162 changes ΔL3 in response to thermal or other changes, and sub-barrel 164 changes ΔL4, then, the physical separation between sub-barrels 162 and 164 must be greater than the accumulative changes in length of sub-barrels 162 and 164 (ΔL3+ΔL4).

FIGS. 3 and 4 show physical separations S1 and S2 between sub-barrels 152 and 154, and 162 and 164, respectively. Physically separating sub-barrels 152 and 154 isolates upper sub-barrel 152 from any thermal and vibrational effects, or other external forces propagated by lower sub-barrel 154, and vice versa. Similarly, physically separating sub-barrels 162 and 164 isolates upper sub-barrel 162 from lower sub-barrel 154, and vice versa.

Sub-barrels 152, 154, 162, and 164 behave in a similar manner as the lens barrels disclosed in the applicant's co-pending application Serial No. 09/184,651. Each sub-barrel 152, 154, 162, or 164 may comprise a plurality of lens cells, each carrying a piece of lens. Sub-barrels 152, 154, 162, and 164 can be made of a rigid material, such as stainless steel or silicon carbide. For example, stainless steel commonly known in the industry as SS 17-7PH, SS 440 series, or SS 300 series may be used. Alternatively, sub-barrels 152, 154, 162, and 164 can also be made of a material having low coefficient of thermal expansion. For example, the coefficient of thermal expansion may be as low as 6 ppm/° C. or below. Examples of materials having this property are provided in Table 1 below.

Also consistent with the principles of the invention, the catadioptric lens barrel structure is provided with at least one transverse lens barrel connecting one lens barrel to the next successive lens barrel. In one embodiment, each transverse lens barrel comprises a pair of reflective elements. The reflective elements are angularly oriented to reflect an image of a reticle from the first lens barrel to the second lens barrel, and onto a semiconductor wafer in front of an exit end of the second lens barrel. Other embodiments may use more than two lens barrels, wherein adjacent lens barrels are connected by a respective transverse lens barrel.

Returning to FIG. 1, a transverse lens barrel 122 is shown connecting first lens barrel 102 to second lens barrel 112. Transverse lens barrel 122 carries therein a pair of mirrors 124 and 126. Mirror 124 is located inside first sub-barrel 152, and therefore, is not shown in FIG. 1. In one embodiment, mirror 124 and mirror 126 are in planes substantially perpendicular to each other. In one embodiment, transverse lens barrel 122 is made of a material having a low coefficient of thermal expansion. For example, the coefficient of thermal expansion may be as low as 6 ppm/° C. or below. Materials having this property include alumina ceramic ($Al_2O_3$), Invar, Ultra Low Expansion™ (ULE) glass, Zerodur glass, and silicon carbide (SiC).

Further consistent with the principles of the invention, a catadioptric lens barrel structure is provided with a support structure for supporting the lens barrels. The support structure is made of a material having a low coefficient of thermal expansion. The support structure comprises a plurality of support platforms which are parallel to each other and perpendicular to the plurality of optical axes. The number of support platforms corresponds with the number of sub-barrels of a lens barrel.

In the embodiment illustrated in FIG. 1, the catadioptric lens barrel structure 100 further comprises a support structure 132. Support structure 132 includes an upper support platform 134 and a base support platform 136. Base support platform 136 is preferably thicker than upper support platform 134 to provide stronger and sturdier support to catadioptric lens barrel structure 100. Upper and base support platforms 134 and 136 are horizontally positioned perpendicular to optical axes 104 and 114. Support structure 132 also comprises a plurality of support stands 138a, 138b, 138c, 138d, 138e, and 138f that support and connect upper support platform 134 to base support platform 136. Support stands 138a, 138b, 138c, 138d, 138e, and 138f, are stiff and symmetrical with respect to the x-axis and y-axis to prevent shift errors. Shift errors occur when optical sub-axes 153 and 155 do not precisely align with first optical axis 104, and/or optical sub-axes 163 and 165 do not precisely align with second optical axis 114. Support stands 138a, 138b, 138c, 138d, 138e, and 138f, may be constructed vertically parallel to the z-axis, or may also have a tilt as shown in FIG. 1. Support structure 132 may also comprise a support stand 140 to support transverse lens barrel 122.

Support structure 132, including support platforms 134, 136, and support stands 138a, 138b, 138c, 138d, 138e, 138f, and 140, are made of a material having a low coefficient of thermal expansion. The coefficient of thermal expansion may be as low as 6 ppm/° C. or below. A coefficient of thermal expansion of a material represents a characteristic of the material in response to thermal changes, and is measured in parts per million for every centigrade of temperature gradient. Table 1 below shows some examples of materials having this property.

TABLE 1

| Materials | Coefficients of Thermal Expansion |
| --- | --- |
| Alumina Ceramic ($Al_2O_3$) | 5.7 ppm/° C. |
| Invar | 0.64–3.11 ppm/° C. (depending on heat treatment) |
| ULE ™ | 0.03 ppm/° C. |
| Zerodur | 0.05 ppm/° C. |
| Silicon Carbide (SiC) | 0.4–5.1 ppm/° C. (depending on temperature range) |

When the temperature changes, either increases or decreases, sub-barrels 152, 154, 162, and 164, including support structure 132 and transverse lens barrel 122, will expand or contract accordingly. The change in length of each part ($\Delta L$) can be mathematically determined according to this expression:

$$\Delta L = \alpha \cdot L \cdot \Delta T$$

wherein $\alpha$ is the coefficient of thermal expansion of the material of the part; L is the initial length of the part; and $\Delta T$ is the final temperature subtracted from the initial temperature. The change in length affects the alignment of catadioptric lens barrel structure 100 including the lenses and mirrors inside the lens barrels, and subsequently, causes a substantial error in transferring the reticle image to the wafer.

In catadioptric lens barrel structure 100 consistent with the principles of this invention, for example, each sub-barrel 152, 154, 162, or 164, having a length L1, L2, L3, or L4, respectively, will experience a change in length by $\Delta L1$, $\Delta L2$, $\Delta L3$, or $\Delta L4$. However, because upper and base support platforms 134 and 136 are made of material having an extremely low coefficient of thermal expansion, the platforms expand or contract at the same rate and do so very minimally, if at all. Therefore, first and second optical axes 104 and 114, respectively, remain substantially parallel, and distance D between optical axes 104 and 114 remains substantially constant, regardless of temperature changes. The parallel orientation of optical axes 104 and 114 and distance D are two key parameters of this type of catadioptric lens barrel structure because they represent the path of light beam 128 as will be discussed below with respect to FIG. 2. If optical axes 104 and 114 are misaligned, and distance D has changed, light beam 128 will be distorted and will not etch semiconductor wafer 118 at the precise targeted location.

Likewise, support stands 138a, 138b, 138c, 138d, 138e, and 138f, are made of a material having an extremely low coefficient of thermal expansion, and therefore expand or contract at the same rate and do so very minimally, if at all. Therefore, distance Y between upper and base support platforms 134 and 136 remains substantially constant. More importantly, the expansion or contraction of upper sub-barrel 152 ($\Delta L1$) does not affect the expansion or contraction of lower sub-barrel 154 ($\Delta L2$) because the physical separation S1 between sub-barrels 152 and 154 is greater than $\Delta L1 + \Delta L2$ as previously discussed. Similarly, the expansion or contraction of upper sub-barrel 162 ($\Delta L3$) will not affect the expansion or contraction of lower sub-barrel 164 ($\Delta L4$) because the physical separation S2 between sub-barrels 162 and 164 is greater than $\Delta L3 + \Delta L4$.

Moreover, optical sub-axes 153 and 155 remain substantially aligned with first optical axis 104, and optical sub-axes 163 and 165 remain substantially aligned with second optical axis 114. Therefore, shift errors are kept at a minimum.

Transverse lens barrel 122 is also made of a low expansion material such as one of the materials selected from Table 1, and preferably, although not necessarily, of the same material as for upper and base support platforms 134, 136. If transverse lens barrel 122 is made of a different material than the upper or base support platforms 134, 136, then an adjustment mechanism will be needed to compensate for the differences in materials.

Figure 2:
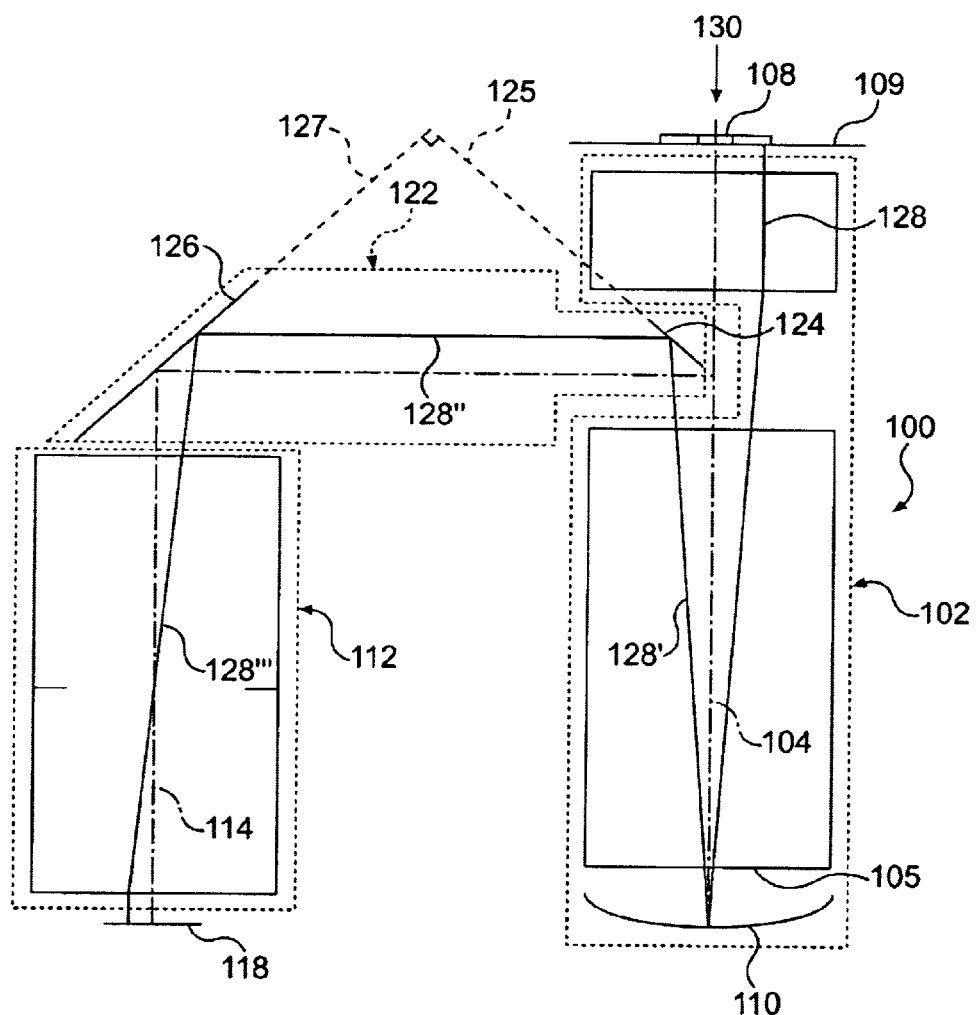
FIG. 2 is a schematic diagram of the catadioptric lens barrel structure, illustrated with light path passing through the lens barrel structure.

FIG. 2 illustrates the path of exemplary light beam 128 through lens barrel structure 100 of FIG. 1. Light source 130 illuminates reticle 108. Reticle 108 is shown as placed on an image plane 109. Light source 130 enters first lens barrel 102. A reflective element 110, such as a mirror, is provided and positioned in front of an exit end 105 of first lens barrel 102 on an opposing end of reticle 108. Mirror 110 preferably has an optical axis which is aligned with first optical axis 104. Light beam 128 is reflected off of mirror 110, illustrated as light beam 128'. Light beam 128' travels back through first lens barrel 102. Light beam 128' then hits mirror 124 carried inside transverse lens barrel 122, is reflected off of mirror 124, as light beam 128", and is reflected off of mirror 126, as light beam 128'''. Light beam 128''' travels through second lens barrel 112 and hits wafer 118. Mirrors 124 and 126 are preferably oriented at 45° angle from light beams 128' and 128", respectively. Therefore, in this embodiment if imaginary extension lines 125 and 127 are drawn from mirrors 124 and 126, respectively, it will be shown that mirrors 124 and 126 are perpendicular to each other.

Figure 5:
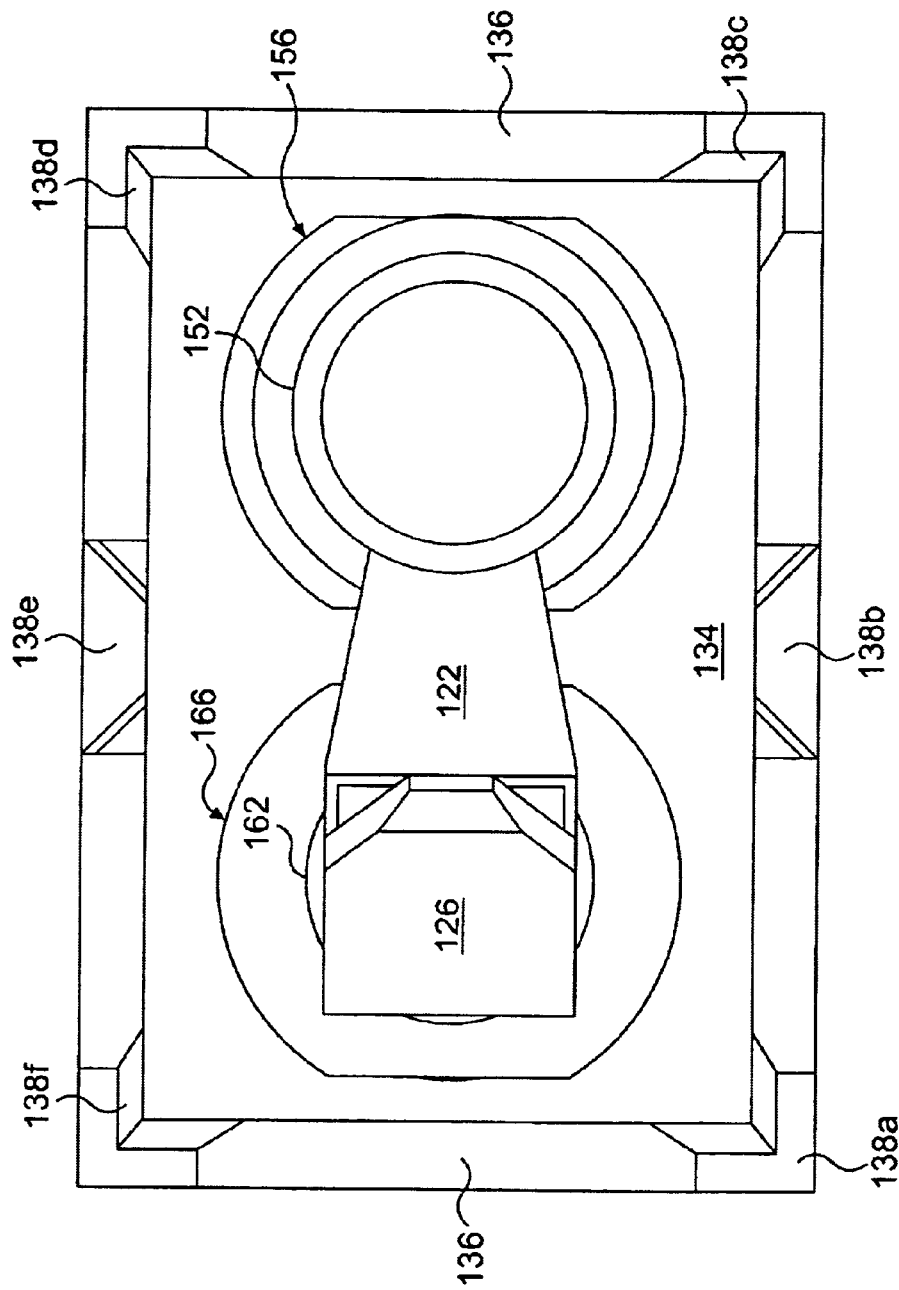
FIG. 5 is a top view of the catadioptric lens barrel structure consistent with the principles of the present invention.

FIGS. 3, 4, and 5 show front, side, and top views, respectively, of catadioptric lens barrel 100. Upper support platform 134 has openings 172 and 182 to accommodate upper sub-barrels 152 and 162, respectively. Openings 172 and 182 are slightly larger in diameter than the outer diameters of sub-barrels 152 and 162, respectively, to provide clearance for expansion and contraction. Two pairs of flanges 156a, 156b, 166a, and 166b are provided around openings 172 and 182 to firmly secure upper sub-barrels 152 and 162, respectively, to upper support platform 134. Similarly, base support platform 136 has openings 174 and 184 to accommodate lower sub-barrels 154 and 164, respectively. Openings 174 and 184 are slightly larger in diameter than the outer diameters of lower sub-barrels 154 and 164, respectively, to provide clearance for expansion and contraction. Flanges 158 and 168 are provided around openings 174 and 184 to firmly secure lower sub-barrels 154 and 164, respectively, to base support platform 136.

It will be apparent to those skilled in the art that various modifications and variations can be made in the catadioptric lens barrel structure, the material chosen for the present invention, and in construction of the number of lens barrels arrangement and the support structure as well as other aspects of the invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

I claim:

1. A lens barrel structure, comprising:
   a plurality of lens barrels, each lens barrel having an optical axis running along a length of the lens barrel, wherein each lens barrel comprises a plurality of sub-barrels physically separated and serially oriented along the corresponding optical axis;
   at least one transverse lens barrel between one lens barrel and a next successive lens barrel; and
   a support structure supporting each sub-barrel of the plurality of lens barrels.

2. A lithography system, comprising a lens barrel structure as claimed in claim 1.

3. The lens barrel structure of claim 1, wherein at least one of the sub-barrels is physically separate from the rest of the sub-barrels.

4. A lens barrel structure, comprising:
   a plurality of lens barrels, each lens barrel having an optical axis running along a length of the lens barrel, wherein at least one of the lens barrels comprises a plurality of sub-barrels serially oriented along the corresponding optical axis; and
   a support structure for supporting each of the plurality of lens barrels,
   wherein the support structure is made of a material having a coefficient of thermal expansion of 6 ppm/° C. or below.

5. The lens barrel structure of claim 4, wherein the material is selected from the group consisting of alumina ceramic, Ultra Low Expansion™ glass, Zerodur glass, silicon carbide, and Invar.

6. The lens barrel structure of claim 4, wherein at least one of the sub-barrels is physically separate from the rest of the sub-barrels.

7. A lens barrel structure, comprising:
   a plurality of lens barrels, each lens barrel having an optical axis running along a length of the lens barrel, wherein each lens barrel comprises a same number of sub-barrels physically separated and serially oriented along the optical axis thereof; and
   a support structure supporting each sub-barrel of the plurality of lens barrels, wherein the support structure comprises a plurality of support platforms corresponding to the number of sub-barrels.

8. The lens barrel structure of claim 7, wherein the support structure further comprises a plurality of support stands for supporting the plurality of support platforms.

9. The lens barrel structure of claim 7, wherein, for each lens barrel, at least one of the sub-barrels is physically separate from the rest of the sub-barrels.

10. A lens barrel structure, comprising:
    a plurality of lens barrels, each lens barrel having an optical axis running along a length of the lens barrel, wherein each lens barrel comprises a plurality of sub-barrels physically separated and serially oriented along the corresponding optical axis;
    a support structure supporting each sub-barrel of the plurality of lens barrels; and
    at least one transverse lens barrel between one lens barrel and a next successive lens barrel, each transverse lens barrel comprising a pair of reflective elements for reflecting an image from the one lens barrel to the next successive lens barrel.

11. The lens barrel structure of claim 10, wherein at least one of the sub-barrels is physically separate from the rest of the sub-barrels.

12. A lens barrel structure, comprising:
    a plurality of lens barrels, each lens barrel having an optical axis running along a length of the lens barrel, wherein at least one of the lens barrels comprises a plurality of sub-barrels serially oriented along the corresponding optical axis;
    support structure supporting each of the plurality of lens barrels; and
    at least one transverse lens barrel between one lens barrel and a next successive lens barrel, each transverse lens barrel comprising a pair of reflective elements for reflecting an image from the one lens barrel to the next successive lens barrel,
    wherein the at least one transverse lens barrel and the support structure are made of materials having coefficients of thermal expansion of 6 ppm/° C. or below.

13. The lens barrel structure of claim 12, wherein the materials are selected from the group consisting of alumina ceramic, Ultra Low Expansion™ glass, Zerodur glass, silicon carbide, and Invar.

14. A method for making a lens barrel structure, comprising:
    providing a plurality of lens barrels, each lens barrel having an optical axis running along a length of the lens barrel, wherein each lens barrel comprises physically separate, serially oriented sub-barrels, each sub-barrel having an optical sub-axis;
    disposing at least one transverse lens barrel between one lens barrel and the next successive lens barrel;
    aligning the optical sub-axis of each sub-barrel in a series with the optical axis of the corresponding lens barrel; and
    supporting each sub-barrel with a support structure.

15. The method of claim 14, wherein each transverse lens barrel comprises a pair of reflective elements for reflecting an image from the one lens barrel to the next successive lens barrel.

16. A method for making a lens barrel structure, comprising:
    providing a plurality of lens barrels, each lens barrel having an optical axis running along a length of the lens barrel, wherein at least one of the lens barrels comprises physically separate, serially oriented sub-barrels, each sub-barrel having an optical sub-axis;
    aligning the optical sub-axis of each sub-barrel in a series with the optical axis of the corresponding lens barrel; and
    supporting each lens barrel with a support structure made of a material having a coefficient of thermal expansion of 6 ppm/° C. or below.

17. The method of claim 16, wherein the material is selected from the group consisting of alumina ceramic, Ultra Low Expansion™ glass, Zerodur glass, silicon carbide, and Invar.

18. A method for making a lens barrel structure, comprising:
    providing a plurality of lens barrels, each lens barrel having an optical axis running along a length of the lens barrel, wherein each lens barrel comprises physically separate, serially oriented sub-barrels, each sub-barrel having an optical sub-axis;

aligning the optical sub-axis of each sub-barrel in a series with the optical axis of the corresponding lens barrel; and supporting each lens barrel, wherein the step of supporting each lens barrel further comprises the steps of:
- maintaining the plurality of lens barrels so that the plurality of optical axes remain substantially parallel;
- maintaining the plurality of lens barrels so that the distance separating one optical axis and the next successive optical axis remains substantially constant; and
- maintaining the plurality of sub-barrels so that the distance separating two sub-barrels in a series remains substantially constant.

19. A method for making a lens barrel structure, comprising:

providing a plurality of lens barrels, each lens barrel having an optical axis running along a length of the lens barrel, wherein at least one of the lens barrels comprises physically separate, serially oriented sub-barrels, each sub-barrel having an optical sub-axis;

disposing at least one transverse lens barrel between one lens barrel and the next successive lens barrel, each transverse lens barrel comprising a pair of reflective elements for reflecting an image from the one lens barrel to the next successive lens barrel;

aligning the optical sub-axis of each sub-barrel in a series with the optical axis of the corresponding lens barrel; and supporting each lens barrel with a support structure,
- wherein the at least one transverse lens barrel and the support structure are made of materials having coefficients of thermal expansion of 6 ppm/° C. or below.

20. The method of claim 19, wherein the materials are selected from the group consisting of alumina ceramic, Ultra Low Expansion™ glass, Zerodur glass, silicon carbide, and Invar.

* * * * *